US008691898B2

(12) United States Patent
Kamo et al.

(10) Patent No.: US 8,691,898 B2
(45) Date of Patent: Apr. 8, 2014

(54) RESIN COMPOSITION

(75) Inventors: Hiroshi Kamo, Tokyo (JP); Tetsuo Kurihara, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 81 days.

(21) Appl. No.: 11/665,369

(22) PCT Filed: Oct. 7, 2005

(86) PCT No.: PCT/JP2005/018612
§ 371 (c)(1),
(2), (4) Date: Apr. 13, 2007

(87) PCT Pub. No.: WO2006/041023
PCT Pub. Date: Apr. 20, 2006

(65) Prior Publication Data
US 2007/0270530 A1 Nov. 22, 2007

(30) Foreign Application Priority Data

Oct. 14, 2004 (JP) ................................. 2004-299760
Oct. 19, 2004 (JP) ................................. 2004-303704

(51) Int. Cl.
C07F 7/18 (2006.01)
C08K 5/13 (2006.01)
C08L 71/12 (2006.01)

(52) U.S. Cl.
USPC ........... 524/188; 524/323; 524/342; 524/609; 524/611; 524/612

(58) Field of Classification Search
USPC ......... 524/186, 323, 326, 342, 344, 345, 188, 524/609, 611, 612
See application file for complete search history.

(56) References Cited

U.S. PATENT DOCUMENTS

| 3,257,357 | A | | 6/1966 | Stamatoff | |
|---|---|---|---|---|---|
| 3,257,358 | A | | 6/1966 | Stamatoff | |
| 3,306,875 | A | | 2/1967 | Hay | |
| 4,434,265 | A | * | 2/1984 | Chasar | 524/339 |
| 4,617,336 | A | * | 10/1986 | Pastor et al. | 524/291 |
| 4,695,594 | A | * | 9/1987 | Pressman | 521/92 |
| 4,729,854 | A | * | 3/1988 | Miyata et al. | 252/609 |
| 5,055,507 | A | * | 10/1991 | Haruna et al. | 524/117 |
| 5,219,940 | A | * | 6/1993 | Nakano | 525/133 |
| 5,250,595 | A | * | 10/1993 | Miyashita et al. | 524/114 |
| 5,326,807 | A | * | 7/1994 | Kato et al. | 524/413 |
| 5,498,689 | A | | 3/1996 | Furuta et al. | |
| 5,625,000 | A | | 4/1997 | Furuta et al. | |
| 6,759,460 | B2 | * | 7/2004 | Kamo et al. | 524/100 |
| 2002/0055567 | A1 | | 5/2002 | Romenesko et al. | |
| 2002/0193533 | A1 | * | 12/2002 | Kamo et al. | 525/397 |
| 2004/0186038 | A1 | * | 9/2004 | Kischkel et al. | 510/445 |

FOREIGN PATENT DOCUMENTS

| EP | 0 633 293 A2 | 1/1995 |
|---|---|---|
| EP | 0 648 810 A1 | 4/1995 |
| EP | 0 614 927 A1 | 9/1995 |
| JP | 50-51197 | 5/1975 |
| JP | 52-17880 | 2/1977 |
| JP | 63-152628 | 6/1988 |
| JP | 02-117957 | 2/1990 |
| JP | 2-97555 | 4/1990 |
| JP | 5-202273 | 8/1993 |
| JP | 5-239322 | 9/1993 |
| JP | 6-122762 | 5/1994 |
| JP | 7-3137 | 1/1995 |
| JP | 7-32454 | 2/1995 |
| JP | 7-70394 | 3/1995 |
| JP | 7-145308 | 6/1995 |
| JP | 7-150000 | 6/1995 |
| JP | 10-500448 | 1/1998 |
| JP | 2000-198910 | 7/2000 |
| JP | 2000-198916 | 7/2000 |
| JP | 2001-505241 | 4/2001 |
| JP | 2004-121112 | 4/2004 |
| JP | 2004-211084 | 7/2004 |
| JP | 2004-339491 | 12/2004 |
| JP | 2005-57000 | 3/2005 |
| JP | 2005-154582 | 6/2005 |
| JP | 2005-255941 | 9/2005 |

OTHER PUBLICATIONS

Machine translation of JP 2000-198916 A, Shimizu et al.*
PCT International Search Report of International Published Application No. PCT/JP2005/018612.
European Search Report dated May 11, 2010 in corresponding European Patent Application 09009236.2.
Partial European Search Report dated Jan. 19, 2010 and issued in corresponding European Patent Application 09009236.2.

* cited by examiner

Primary Examiner — Nicole M Buie-Hatcher
(74) Attorney, Agent, or Firm — Staas & Halsey LLP

(57) ABSTRACT

It is an object to provide a resin composition in which fluidity is conferred while maintaining the high heat resistance of a highly heat-resistant non-crystalline resin, an amount of foreign matter is greatly reduced, there is no mold deposit, the metering stability is excellent, and the transparency is also good, and a resin composition in which good heat resistance and fluidity are both achieved, the amount of foreign matter is reduced, generation of fines is reduced, and there is no bleeding out. According to the present invention, there is provided a resin composition comprising; (A) a resin component comprising 70 to 100% by weight of at least one resin selected from the group consisting of a polyphenylene ether resin, a polycarbonate resin, a polysulfone resin, a polyethersulfone resin, a polyarylate resin, a polyamide-imide resin, a polyetherimide resin, and a thermoplastic polyimide resin; and (B) an organic compound having a melting point of not less than 200° C., the organic compound being from 0.1 to 40 parts by weight based on 100 parts by weight of the resin component (A).

18 Claims, No Drawings

RESIN COMPOSITION

CROSS REFERENCE TO RELATED APPLICATIONS

This application is based on PCT Application No. PCT/JP2005/018612, filed on Oct. 7, 2005 and Japanese Application Nos. 2004-299760, filed on Oct. 14, 2004, and 2004-303704, filed Oct. 19, 2004, the disclosures of which are hereby incorporated herein by reference.

TECHNICAL FIELD

The present invention relates to a thermoplastic resin composition in which the number of foreign matter is extremely low, fluidity is conferred while maintaining high heat resistance, there is no mold deposit, the metering stability is excellent, and the transparency is excellent, and furthermore there is little generation of fines, and little bleeding out.

BACKGROUND ART

Non-crystalline heat-resistant resins such as polyphenylene ether resins, polycarbonate resins, polysulfone resins, polyethersulfone resins, polyarylate resins, polyamide-imide resins, polyetherimide resins and thermoplastic polyimide resins (most of these are also known as "super engineering plastics") have a merit of having high heat resistance, but the fluidity when molding is insufficient. Fluidity can thus be conferred by adding plasticizers and flame retardants into the above heat-resistance resins, but there may be a problem that the heat resistance as a resin deteriorates. Thus, there is a demand for the heat-resistant resins to confer fluidity while still maintaining a high degree of heat resistance.

More specifically, polyphenylene ether resins have excellent properties such as heat resistance, water-absorbing property, dimensional stability, and mechanical and electrical properties, and are used, for example, in various applications such as industrial goods, electrical/electronic components, office equipment, various housings, automobile parts, and precision parts. However, with a polyphenylene ether resin alone, there is a lack of fluidity, chemical resistance and so on, and hence alloying with another resin such as polystyrene is widely known. However, if high impact polystyrene or the like is added into the polyphenylene ether resins, then the resin generally loses transparency. Polyphenylene ether resin compositions that have good fluidity conferred thereon while maintaining a high degree of heat resistance, and are transparent, although colored, have thus been desired. In addition, resin compositions containing a high polyphenylene ether proportion therein have a very high melt viscosity, and hence the processing temperature must be made to be approximately 300° C., whereupon degradation, gelation and so on becomes prone to occur, thereby causing foreign matter to arise in products. Such foreign matter causes a deterioration in properties, a deterioration in the external appearance of products and so on, and hence there are strong needs in industry to reduce the amount of, or if possible eliminate, such foreign matter.

From the viewpoint of suppressing oxidative degradation and thermal degradation of a polymer, there has been proposed to add a high melting point hindered phenol into polyphenylene ether, but an amount of the phenolic additive is very low, i.e. not sufficient for the phenolic additive to act as a fluidity-conferring agent, and also insufficient with regard to transparency and metering stability (See, for example, Japanese Patent Application Laid-open No. 07-32454, Japanese Patent Application Laid-open No. 07-145308, Japanese Patent Application Laid-open No. 07-150000).

As a technology for conferring fluidity while maintaining heat resistance, on one hand, there has been proposed to alloy a polyphenylene ether with a liquid-crystal polyester (See, for example, Japanese Patent Application Laid-open No. 07-70394, Japanese Patent Application Laid-open No. 7-3137, Japanese Patent Application Laid-open No. 6-122762). However, there is no mention of liquid paraffin in these documents, nor is there any mention of reducing the amount of foreign matter, generation of fines, or bleeding out.

On the other hand, there has been proposed to add a white oil into a polyphenylene ether and a liquid-crystal polyester (See, for example, Japanese Patent Application Laid-open No. 05-202273, Japanese Patent Application Laid-open No. 05-239322), but in these documents the proportion of the liquid-crystal polyester is high, and hence the liquid-crystal polyester is the material forming a continuous phase, and moreover there is no mention of reducing the amount of foreign matter and generation of fines.

Further, there has been proposed to add an aromatic compound such as tertiary butyl hydroquinone as a compatibilizer for a polyphenylene ether a the liquid-crystal polyester (See, for example, Japanese Patent Application Laid-open No. 10-500448), but all such compatibilizer has a molecular weight of less than 400, and moreover there is no mention of reducing the amount of foreign matter, achieving both good heat resistance and good fluidity, or generation of fines.

Furthermore, there has been proposed to blend an antioxidant into an alloy of a polyphenylene ether and a liquid-crystal polyester, but only common antioxidants are mentioned in this document, and moreover there is no mention of reducing the amount of foreign matter, or generation of fines (See, for example, Japanese Patent Application Laid-open No. 02-97555).

Moreover, there has been proposed a blend of a polyphenylene ether, a liquid-crystal polyester, and a hydrocarbon wax, but there is no mention of a specific phenolic stabilizer, and there is also no mention of reducing the amount of foreign matter, or generation of fines (Japanese Patent Application Laid-open No. 2004-121).

DISCLOSURE OF INVENTION

Problems to be Solved by the Invention

In the first aspect of the present invention, it is an object to provide a resin composition in which fluidity is conferred while maintaining the high heat resistance of a highly heat-resistant non-crystalline resin, an amount of foreign matter is greatly reduced, there is no mold deposit, the metering stability is excellent, and the transparency is also good. In the second aspect of the present invention, it is another object to provide a resin composition in which good heat resistance and fluidity are both achieved, the amount of foreign matter is reduced, generation of fines is reduced, and there is no bleeding out.

Means for Solving the Problems

In view of the above, the present inventors carried out assiduous studies to attain the above objects, and as a result accomplished the present invention after discovering that by adding a specified organic compound to a highly heat-resistant non-crystalline resin, a resin composition can be obtained in which a high degree of heat resistance and fluidity are both achieved, the amount of foreign matter is greatly reduced, there is no mold deposit, the metering stability is excellent, generation of fines is reduced, and there is no bleeding out.

That is, the present invention provides;

1. A resin composition comprising: (A) a resin component comprising 70 to 100% by weight of at least one resin selected from the group consisting of a polyphenylene ether resin, a polycarbonate resin, a polysulfone resin, a polyethersulfone resin, a polyarylate resin, a polyamide-imide resin, a polyetherimide resin, and a thermoplastic polyimide resin; and (B) an organic compound having a melting point of not less than 200° C., the organic compound being from 0.1 to 40 parts by weight based on 100 parts by weight of the resin component (A).

2. The resin composition according to item 1, wherein the organic compound (B) is a phenolic stabilizer having a molecular weight of not less than 400, and a value of (number of hydroxyl group per a molecule/molecular weight) of not less than 0.0035.

3. The resin composition according to item 1 or 2, wherein the organic compound (B) is contained in a range of from more than 5 to not more than 40 parts by weight based on 100 parts by weight of the resin component (A).

4. The resin composition according to any one of items 1 to 3, wherein the resin component (A) is a polyphenylene ether resin.

5. The resin composition according to any one of items 1 to 4, further comprising: (C) 0.1 to 30 parts by weight of a liquid-crystal polyester based on 100 parts by weight of the resin component (A).

6. The resin composition according to item 5, wherein the liquid-crystal polyester (C) comprises a structure represented by the following formula (1):

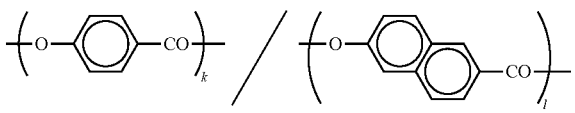

formula (1)

7. The resin composition according to any one of items 1 to 6, further comprising: (D) 0.1 to 5 parts by weight of a lubricant based on 100 parts by weight of the resin component (A).

8. The resin composition according to item 7, wherein the lubricant is liquid paraffin.

9. The resin composition according to any one of items 5 to 8, further comprising: (E) 0.1 to 20 parts by weight of a compound containing a monovalent, divalent, trivalent or tetravalent metallic element based on 100 parts by weight of the resin component (A).

10. The resin composition according to item 9, wherein the compound (E) containing the monovalent, divalent, trivalent or tetravalent metallic element is ZnO and/or Mg(OH)$_2$.

11. The resin composition according to any one of items 5 to 10, further comprising: (F) 0.1 to 5 parts by weight of a silane compound having an amino group based on 100 parts by weight of the resin component (A).

12. The resin composition according to any one of items 1 to 10, wherein the organic component (B) has a structure represented by the following formula (2):

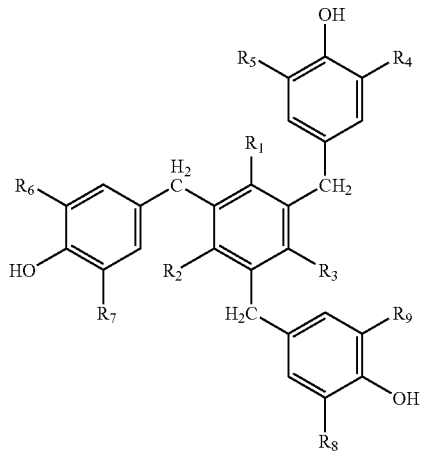

formula (2)

wherein each of $R_1$, $R_2$ and $R_3$ independently represents a group selected from the group consisting of a hydrogen atom and alkyl groups having 1 to 5 carbon atoms, and each of $R_4$, $R_5$, $R_6$, $R_7$, $R_8$ and $R_9$ independently represents a group selected from the group consisting of a hydrogen atom and alkyl groups having 1 to 6 carbon atoms.

Advantageous Effects of the Invention

According to the first aspect of the present invention, there can be provided a resin composition in which fluidity is conferred while maintaining the high heat resistance of a highly heat-resistant non-crystalline resin, an amount of foreign matter is greatly reduced, there is no mold deposit, the metering stability is excellent, and the transparency is also good. According to the second aspect of the present invention, there can also be provided a resin composition in which good heat resistance and fluidity are both achieved, the amount of foreign matter is reduced, generation of fines is reduced, and there is no bleeding out.

BEST MODE FOR CARRYING OUT THE INVENTION

Following is a detailed description of the present invention.

Examples of component (A) used in the present invention include polyphenylene ether resins, polycarbonate resins, polysulfone resins, polyethersulfone resins, polyarylate resins, polyamide-imide resins, polyetherimide resins, and thermoplastic polyimide resins; one of these may be used alone, or two or more may be used mixed together. More specifically, examples of the component (A) include polyphenylene ether resins, polycarbonate resins, mixtures of a polycarbonate and an acrylonitrile-butadiene-styrene copolymer, polysulfone resins, polyethersulfone resins, polyarylate resins, polyamide-imide resins, polyetherimide resins, thermoplastic polyimide resins. A polyphenylene ether resin or a polycarbonate resin is preferably used, more preferably a polyphenylene ether resin. In particular, from the viewpoint of heat resistance, the resin component (A) preferably contains 70 to 100% by weight of at least one of such non-crystalline thermoplastic resins, preferably 75 to 100% by weight, more preferably 85 to 100% by weight, yet more preferably 90 to 100% by weight in the resin component (A).

A polyphenylene ether resin particularly preferably used in the present invention comprises a homopolymer and/or copolymer having a repeat unit structure of formula (3) and having a reduced viscosity (measured at 30° C., 0.5 g/dl, chloroform solution) in a range of 0.15 to 1.0 dl/g. A more preferable range for the reduced viscosity is in a range of from 0.20 to 0.70 dl/g, with 0.40 to 0.60 dl/g being yet more preferable.

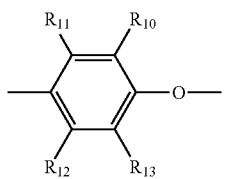

formula (3)

(wherein each of $R_{10}$ and $R_{13}$ independently represents a hydrogen atom, a primary or secondary lower alkyl group, a phenyl group, an aminoalkyl group, or a hydrocarbon-oxy group. Each of $R_{11}$ and $R_{12}$ independently represents a hydrogen atom, a primary or secondary lower alkyl group or a phenyl group.)

Specific examples of such polyphenylene ether resins include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether) or the like. Furthermore, other examples include polyphenylene ether copolymers such as a copolymer between 2,6-dimethylphenol and another phenol (e.g. 2,3,6-trimethylphenol or 2-methyl-6-butylphenol). Of these, poly (2,6-dimethyl-1,4-phenylene ether), and a copolymer between 2,6-dimethylphenol and 2,3,6-trimethylphenol are preferable, with poly(2,6-dimethyl-1,4-phenylene ether) being more preferable.

As a method of producing polyphenylene ether (A) used in the present invention, for example, there is a method in which 2,6-xylenol is subjected to oxidative polymerization using a complex between a cuprous salt and an amine as a catalyst as disclosed in U.S. Pat. No. 3,306,874. Methods disclosed in U.S. Pat. No. 3,306,875, U.S. Pat. No. 3,257,357, U.S. Pat. No. 3,257,358, Japanese Patent Publication No. 52-17880, Japanese Patent Application Laid-open No. 50-51197 and Japanese Patent Application Laid-open No. 63-152628 are also preferable for producing polyphenylene ether (A).

In the present invention, such a polyphenylene ether resin may be used as is as a powder after the polymerization process, or may be used in the form of pellets produced by using an extruder or the like and carrying out melt kneading either under or not under a nitrogen gas atmosphere and either with or without devolatilization.

Also included under the polyphenylene ether resin (A) in the present invention are polyphenylene ethers that have been functionalized using any of various dienophilic compounds. Examples of such dienophilic compounds include compounds such as maleic anhydride, maleic acid, fumaric acid, phenyl maleimide, itaconic acid, acrylic acid, methacrylic acid, methyl acrylate, methyl methacrylate, glycidyl acrylate, glycidyl methacrylate, stearyl acrylate, and styrene. Furthermore, as the method of carrying out the functionalization using such a dienophilic compound, the functionalization may be carried out in a molten state either with or without devolatilization using an extruder or the like either under or not under the presence of a radical generating agent. Alternatively, the functionalization may be carried out in a non-molten state, i.e. in a temperature range between room temperature and the melting point, either under or not under the presence of a radical generating agent. Here, the melting point of the polyphenylene ether is defined as the peak top temperature of the peak observed in the temperature-heat flow graph obtained upon heating at 20° C./min during measurement with a differential scanning calorimeter (DSC), and in the case that there are a plurality of peak top temperatures is defined as the highest temperature among these peak top temperatures.

Moreover, the polyphenylene ether resin (A) in the present invention may be a polyphenylene ether resin alone or a mixture of a polyphenylene ether resin and a polystyrene-based resin, and furthermore may also have other resins mixed therein. Examples of polystyrene-based resins include atactic polystyrene, high impact polystyrene, syndiotactic polystyrene, acrylonitrile-styrene copolymers, and acrylonitrile-butadiene-styrene copolymers. In the case of using a mixture of a polyphenylene ether resin and a polystyrene-based resin, the content of the polyphenylene ether resin is not less than 60% by weight, preferably not less than 70% by weight, more preferably not less than 80% by weight, based on the total amount of the polyphenylene ether resin and the polystyrene-based resin.

Component (B) in the present invention is an organic compound having a melting point of not less than 200° C. This is an organic compound formed mainly from carbon, hydrogen and oxygen atoms, but may also contain nitrogen and/or sulfur atoms. From the viewpoint of reducing the amount of foreign matter, the component (B) is preferably a phenolic stabilizer. In particular, this phenolic stabilizer has a melting point of not less than 200° C., a molecular weight of not less than 400, and a value of (number of hydroxyl groups per a molecule/molecular weight) of not less than 0.0035. From the viewpoint of maintaining the heat resistance of the resin composition obtained in the present invention and there being little mold deposit, the melting point of component (B) is not less than 200° C., preferably not less than 220° C., more preferably not less than 230° C., particularly preferably not less than 240° C. From the viewpoint of dispersibility, the upper limit of the melting point is preferably not more than 350° C., more preferably not more than 330° C., particularly preferably not more than 310° C. From the viewpoint of the likelihood of the component (B) remaining in the composition upon melt kneading and there being little mold deposit, the molecular weight is preferably not less than 400, more preferably not less than 450, yet more preferably from 500 to 800, particularly preferably from 650 to 780. Furthermore, an important property of the component (B) is that the value of (number of hydroxyl groups per a molecule/molecular weight) is not less than 0.0035, preferably not less than 0.0036, more preferably not less than 0.0037, yet more preferably not less than 0.0038, particularly preferably not less than 0.00385. It is important for this value to be in such a range from the viewpoint of greatly reducing the amount of foreign matter in the resin composition according to the present invention, there being little mold deposit, and the metering stability upon molding.

It should be noted that the hydroxyl group in (number of hydroxyl groups per a molecule/molecular weight) refers to a phenolic hydroxyl group.

Moreover, from the viewpoint of greatly reducing the amount of foreign matter in the resin composition according to the present invention, achieving a good balance between heat resistance and fluidity, there being little mold deposit, and the metering stability, the component (B) preferably has a structure represented by the following formula (2):

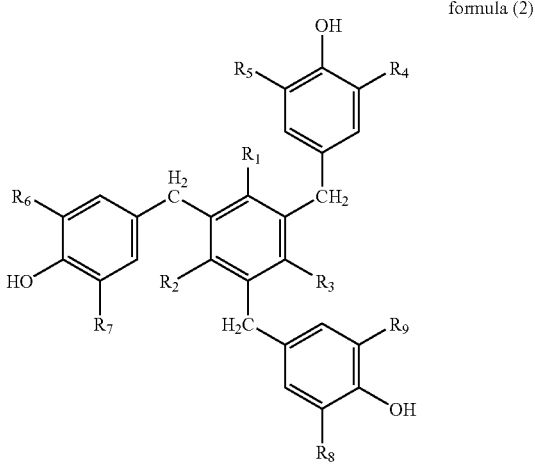

formula (2)

(wherein each of $R_1$, $R_2$ and $R_3$ in formula (2) independently represent a group selected from the group consisting of a hydrogen atom and alkyl groups having 1 to 5 carbon atoms. Each of $R_4$, $R_5$, $R_6$, $R_7$, $R_8$ and $R_9$ in formula (2) independently represents a group selected from the group consisting of a hydrogen atom and alkyl groups having 1 to 6 carbon atoms.)

Moreover, the two substituents adjacent to each phenolic hydroxyl group may be the same or different, but from the viewpoint of ease of manufacture are preferably the same. Furthermore, from the viewpoint of there being little foreign matter or bleeding out, each of $R_1$, $R_2$ and $R_3$ is preferably a hydrogen atom, a methyl group, an ethyl group, or an isopropyl group, more preferably a methyl group. From the viewpoint of being able to greatly reduce the amount of foreign matter, each of $R_4$, $R_5$, $R_6$, $R_7$, $R_8$ and $R_9$ is preferably a hydrogen atom, a methyl group, an isopropyl group, or a tertiary butyl group, more preferably an isopropyl group or a tertiary butyl group, yet more preferably a tertiary butyl group.

Specific examples of the phenolic stabilizer include 1,3,5-trimethyl-2,4,6-tris(3,5-di-t-butyl-4-hydroxybenzyl)benzene, 1,3,5-trimethyl-2,4,6-tris(3,5-di-i-propyl-4-hydroxybenzyl)benzene, 1,3,5-trimethyl-2,4,6-tris(3,5-dimethyl-4-hydroxybenzyl)benzene, 1,3,5-trimethyl-2,4,6-tris(4-hydroxybenzyl)benzene, 1,3,5-tris(3,5-di-t-butyl-4-hydroxybenzyl)benzene, 1,3,5-tris(3,5-di-i-propyl-4-hydroxybenzyl)benzene, 1,3,5-tris(3,5-dimethyl-4-hydroxybenzyl)benzene, 1,3,5-tris(4-hydroxybenzyl) benzene, and 4,4'-butylidenebis(3-methyl-6-t-butylphenol). Of these, 1,3,5-trimethyl-2,4,6-tris(3,5-di-t-butyl-4-hydroxybenzyl)benzene is particularly preferable in terms of the effects of the present invention. As such a compound, it is preferable to select a commercial product such as Irganox 1330™ (manufactured by Ciba Specialty Chemicals), Adeka Stab 330™ (manufactured by Asahi Denka Kogyo) or Anox 330™ (manufactured by Chemtura) or the like.

The resin composition according to the present invention comprises (A) the resin component containing 70 to 100% by weight of at least one resin selected from the group consisting of polyphenylene ether resins, polycarbonate resins, polysulfone resins, polyethersulfone resins, polyarylate resins, polyamide-imide resins, polyetherimide-resins, and thermoplastic polyimide resins; and a content of the component (B) is from 0.1 to 40 parts by weight based on 100 parts by weight of the resin component (A). In particular, from the viewpoint of reducing the amount of foreign matter, conferring fluidity, and mold deposit and the metering stability, this amount is preferably from 0.5 to 40 parts by weight, more preferably from 0.0 to 40 parts by weight, yet more preferably from more than 5 to not more than 40 parts by weight. Moreover, from the viewpoint of the balance between the heat resistance and the fluidity, the upper limit of the content of the component (B) is preferably 35 parts by weight, more preferably 30 parts by weight, yet more preferably 25 parts by weight, still more preferably 10 parts by weight, yet more preferably 7 parts by weight. Moreover, in the case where the resin is transparent with the component (A) alone before adding the component (B), in terms of maintaining the transparency, it is effective to add the component (B) of the present invention into the component (A).

In the first aspect of the present invention, according to the resin composition comprising the component (A) and the component (B), the resin composition can be obtained in which the amount of foreign matter is greatly reduced, good heat resistance and good fluidity are both achieved, there is little generation of fines, and there is no bleeding out.

A liquid-crystal polyester (C) used in the present invention is a polyester which is referred to as a thermotropic liquid-crystal polymer; a publicly known one can be used. Examples of the liquid-crystal polyester (C) include a thermotropic liquid-crystal polyester having as main constituent units thereof p-hydroxybenzoic acid and polyethylene terephthalate, a thermotropic liquid-crystal polyester having as main constituent units thereof p-hydroxybenzoic acid and 2-hydroxy-6-naphthoic acid, and a thermotropic liquid-crystal polyester having as main constituent units thereof p-hydroxybenzoic acid, 4,4'-dihydroxybiphenyl and terephthalic acid or the like.

From the viewpoint of achieving both good heat resistance and good fluidity and the viewpoint of reducing generation of fines, the liquid-crystal polyester (C) preferably contains a structure represented by the following formula (1):

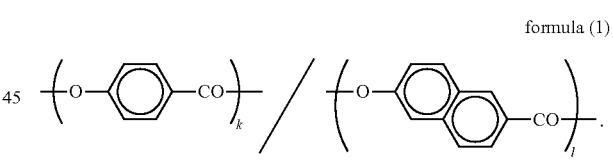

formula (1)

As the liquid-crystal polyester (C) used in the present invention, one comprising the following structural units (i) and (ii), and as necessary (iii) and/or (iv), is preferably used

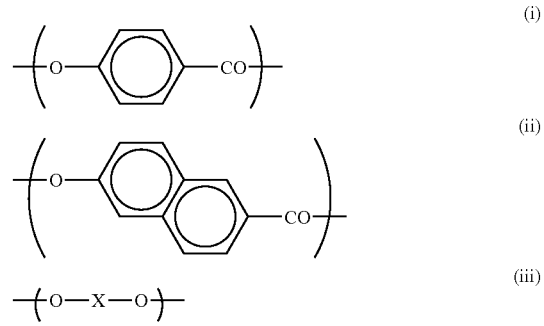

-continued

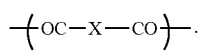 (iv)

Here, structural units (i) and (ii) are a polyester structural unit produced from p-hydroxybenzoic acid, and a structural unit produced from 2-hydroxy-6-naphthoic acid, respectively. By using the structural units (i) and (ii), the resin composition according to the present invention that is excellent in terms of reducing generation of fines and from the viewpoint of achieving both good heat resistance and good fluidity can be obtained. As X in the structural units (iii) and (iv), one or a plurality from the following formula (4) can be freely selected:

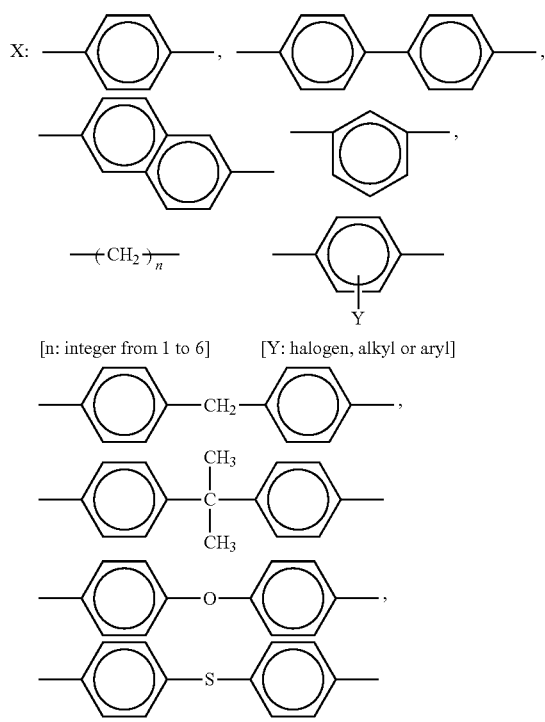

formula (4)

[n: integer from 1 to 6]  [Y: halogen, alkyl or aryl]

Preferable structural units in the structural formula (iii) are ones produced from ethylene glycol, hydroquinone, 4,4'-dihydroxybiphenyl, 2,6-dihydroxynaphthalene, and bisphenol A, respectively, with ethylene glycol, 4,4'-dihydroxybiphenyl and hydroquinone being more preferable, and ethylene glycol and 4,4'-dihydroxybiphenyl being more preferable. Preferable structural units in the structural formula (Iv) are ones produced from terephthalic acid, isophthalic acid, and 2,6-dicarboxynaphthalene, respectively, with terephthalic acid and isophthalic acid being more preferable.

For the structural formula (iii) and the structural formula (iv), one of the above structural units may be used, or two or more may be used in combination. More specifically, in the case of using two or more in combination, examples of the structural formula (iii) include 1) structural units produced from ethylene glycol/structural units produced from hydroquinone, 2) structural units produced from ethylene glycol/structural units produced from 4,4'-dihydroxybiphenyl, and 3) structural units produced from hydroquinone/structural units produced from 4,4'-dihydroxybiphenyl.

Further, examples of the structural formula (iv) include 1) structural units produced from terephthalic acid/structural units produced from isophthalic acid, and 2) structural units produced from terephthalic acid/structural units produced from 2,6-dicarboxynaphthalene. Here, the amount of terephthalic acid out of the two components is preferably not less than 40% by weight, more preferably not less than 60% by weight, particularly preferably not less than 80% by weight. By making the amount of terephthalic acid out of the two components be not less than 40% by weight, the resin composition can be obtained which have relatively good fluidity and heat resistance. There are no particular limitations on the proportions used of the structural units (i), (ii), (iii) and (iv) in the liquid-crystal polyester component (c). However, the amounts of the structural units (iii) and (iv) are fundamentally approximately equimolar.

Furthermore, a structural unit (v) containing the structural units (iii) and (iv) can also be used as a structural unit in component (C). Specific examples include 1) a structural unit produced from ethylene glycol and terephthalic acid, 2) a structural unit produced from hydroquinone and terephthalic acid, 3) a structural unit produced from 4,4'-dihydroxybiphenyl and terephthalic acid, 4) a structural unit produced from 4,4'-dihydroxybiphenyl and isophthalic acid, and 5) a structural unit produced from bisphenol A and terephthalic acid.

 (v)

The liquid-crystal polyester component (C) used in the present invention may as necessary have introduced therein structural units produced from other aromatic dicarboxylic acids, aromatic diols or aromatic hydroxycarboxylic acids, so long as this is in a small amount within a range such as not to impair the characteristic features and effects of the present invention. The temperature at which the component (C) used in the present invention starts to exhibit a liquid-crystal state when molten (hereinafter referred to as the "liquid-crystal commencement temperature") is preferably from 150 to 350° C., more preferably from 180 to 320° C. Making the liquid-crystal commencement temperature be in such a range is preferable since then the amount of black foreign matter in a molding obtained tends to be low.

In the second aspect of the present invention, the added amount of the liquid-crystal polyester (c) to a mixture of the component (A) and the component (B) is preferably from 0.1 to 30 parts by weight based on 100 parts by weight of the component (A). The component (C) is important for conferring fluidity without bringing about a drop in the heat resistance. From the viewpoint of the fluidity and the mechanical strength, the content of the component (C) is preferably from 1 to 30 parts by weight, more preferably from 2 to 20 parts by weight, yet more preferably from 2.5 to 10 parts by weight, still more preferably from 4 to 8 parts by weight, based on 100 parts by weight of the component (A). Furthermore, surprisingly, under the presence of the component (A) and the component (C), adding the component (B) of the present invention is extremely effective in suppressing generation of fines and suppressing bleeding out. From the viewpoint of suppressing generation of fines and suppressing bleeding out in addition to reducing the amount of foreign matter, the content of component (B) in this case is preferably from 0.1 to 40 parts by weight, more preferably 0.5 to 10 parts by weight, yet more preferably 0.9 to 3 parts by weight, based on 100 parts by weight of the component (A).

The lubricant (D) used in the present invention generally refers to a lubricating agent. Examples of the lubricant include an external lubricant which is coated on a surface of pellets and an internal lubricant which is dispersed inside of the pellets by molt kneading the lubricant. Specific examples of the lubricant include hydrocarbon-based lubricants (e.g., fluid paraffin, natural paraffin, low molecular weight polyethylene or the like), aliphatic acid-based lubricants (e.g., higher fatty acids, hydroxyl-fatty acids or the like), fatty acid amides-based lubricants (e.g., fatty acid amides, alkylenebisfatty acid amidines or the like), ester-based lubricants (e.g., lower alcohol ester of fatty acids, multi-valent alcohol of fatty acids, polyglycolester of fatty acids, aliphatic alcohol ester of fatty acids or the like), alcohol-based lubricants (aliphatic alcohol, multi-valent alcohol, polyglycol, polyglycerol or the like), metallic soap-based lubricants or the like. Of these, from the view point of reducing the amount of foreign matter and of conferring fluidity, hydrocarbon-based lubricants are preferable, liquid paraffin is more preferable.

A liquid paraffin (D) used in the present invention is liquid at room temperature and is an oligomer or polymer containing paraffin hydrocarbons. This liquid paraffin is a mixture of paraffin hydrocarbons and alkylnaphthene hydrocarbons. Such a liquid paraffin is also known as "mineral oil". Containing aromatic compounds is undesirable from the viewpoint of the chemical resistance of the polyphenylene ether. Such a liquid paraffin include ones having a specific gravity of not more than 0.8494 at 15° C., and ones having a specific gravity of more than 0.8494 at 15° C. For example, representative examples that can be preferably used include Crystol™ N352, and Primol™ N542 which are manufactured by Exxon Mobil, Diana Process Oil™ PW-380, PW-150, PW-100, and PW-90 which are manufactured by Idemitsu Kosan Co. Ltd.

The resin composition according to the present invention comprises 0.1 to 5 parts by weight of the liquid paraffin (D) based on 100 parts by weight of the component (A). Moreover, in the present invention, under the presence of the components (A), (B) and (C), the component (D) is an extremely important component for reducing the amount of foreign matter and for the fluidity. From the viewpoint of reducing the amount of foreign matter, and the fluidity and bleeding out, the content of the component (D) is preferably from 0.2 to 3 parts by weight, more preferably 0.3 to 2 parts by weight, yet more preferably from 0.4 to 1.5 parts by weight, based on the 100% by weight of the resin component (A).

A compound (E) containing a monovalent, divalent, trivalent or tetravalent metallic element used in the present invention is an inorganic compound or organic compound containing a metal. The component (E) used in the present invention is essentially a compound having as a main component thereof a metallic element. Specific examples of the metallic element that may be a monovalent, divalent, trivalent or tetravalent in the component (E) include Li, Na, K, Zn, Cd, Sn, Cu, Ni, Pd, Co, Fe, Ru, Mn, Pb, Mg, Ca, Sr, Ba, Al, Ti, Ge and Sb. Of these, the elements Zn, Mg, Ti, Pb, Cd, Sn, Sb, Ni, Al and Ge are preferable, with the elements Zn, Mg and Ti being more preferable. From the viewpoint of greatly improving the impact resistance, it is particularly preferable for the monovalent, divalent, trivalent or tetravalent metallic element to be Zn and/or Mg.

Specific examples of the compound (E) containing a monovalent, divalent, trivalent or tetravalent metallic element include oxides, hydroxides, alkoxides, aliphatic carboxylates, or acetates of a metallic element as described above. Examples of preferable oxides include ZnO, MgO, $TiO_4$, $TiO_2$, PbO, CdO, SnO, SbO, $Sb_2O_3$, NiO, $Al_2O_3$, GeO or the like. Examples of preferable hydroxides include $Zn(OH)_2$, $Mg(OH)_2$, $Ti(OH)_4$, $Ti(OH)_2$, $Pb(OH)_2$, $Cd(OH)_2$, $Sn(OH)_2$, $Sb(OH)_2$, $Sb(OH)_3$, $Ni(OH)_2$, $Al(OH)_3$, $Ge(OH)_2$ or the like. Examples of preferable alkoxides include $Ti(OiPr)_4$, $Ti(OnBu)_4$ or the like. Examples of preferable aliphatic carboxylates include zinc stearate, magnesium stearate, titanium stearate, lead stearate, cadmium stearate, tin stearate, antimony stearate, nickel stearate, aluminum stearate, germanium stearate or the like. Of the above, more preferable specific examples are ZnO, $Mg(OH)_2$, $Ti(OiPr)_4$, $Ti(OnBu)_4$, zinc acetate, zinc stearate, and aluminum stearate. ZnO and/or $Mg(OH)_2$ is/are particularly preferable.

Under the presence of the components (A), (B) and (C), or under the presence of the components (A), (B), (C) and (D), the content of the component (E) used in the present invention is from 0.1 to 20 parts by weight based on 100 parts by weight of the component (A). From the viewpoint of phase separation of the resin composition and the mechanical strength (tensile strength, elongation, impack resistance, etc.), the content of the component (E) is preferably from 0.2 to 15 parts by weight, more preferably from 0.5 to 1 parts by weight based on 100 parts by weight of the component (A).

The component (F) used in the present invention is a silane compound having an amino group. As the component (F), a silane coupling agent containing an amino group is preferable. Specific examples include γ-aminopropyltrimethoxysilane, γ-aminopropyltriethoxysilane, γ-aminopropylmethyldimethoxysilane, N(β-aminoethyl)-γ-aminopropyltrimethoxysilane, N(β-aminoethyl)-γ-aminopropylmethyldimethoxysilane, γ-phenyl-γ-aminopropyltrimethoxysilane or the like. γ-Aminopropyltrimethoxysilane and γ-aminopropylmethyldimethoxysilane are particularly preferable.

Under the presence of the components (A), (B) and (C), or under the presence of the components (A), (B), (C) and (D), or under the presence of the components (A), (B), (C), (D) and (E), the content of the component (F) in the present invention is from 0.1 to 5 parts by weight based on 100 parts by weight of the component (A). From the viewpoint of phase separation of the resin composition and the mechanical strength (tensile strength, elongation, impact resistance, etc.), the content of the component (F) is preferably from 0.1 to 3 parts by weight, more preferably from 0.2 to 1 parts by weight based on 100 parts by weight of the component (A).

In the present invention, in addition to the above components, other additional components may be added as necessary within a range such as not to impair the characteristic features and effects of the present invention. For example, it is possible to add into the resin component according to the present invention flame retardants (organic phosphate compounds, phosphazene compounds, silicone compounds), elastomers (ethylene/propylene copolymers, ethylene/1-butene copolymers, ethylene/propylene/non-conjugated diene copolymers, ethylene/ethyl acrylate copolymers, ethylene/glycidyl methacrylate copolymers, ethylene/vinyl acrylate/glycidyl methacrylate copolymers and ethylene/propylene-g-maleic anhydride copolymers, styrene copolymers such as ABS, polyester-polyether elastomers, polyester-polyester elastomers, vinyl aromatic compound-conjugated diene compound block copolymers, hydrogenated vinyl aromatic compound-conjugated diene compound block copolymers), plasticizers (low-molecular-weight polyethylene, epoxidized soybean oil, polyethylene glycol, fatty acid esters, etc.), flame retardant auxiliaries, weather (light) resistance improvers, various colorants, mold release agents or the like.

The resin composition according to the present invention can be manufactured by using any of various methods. An example is a hot melt kneading method using a single-screw extruder, a twin-screw extruder, a roller, a kneader, a Brabender Plastograph, a Banbury mixer or the like. Of these, a melt kneading method using a twin-screw extruder is most preferable. Here, there are no particular limitations on the melt kneading temperature, but this can generally be selected optionally from a range of from 150 to 350° C.

The resin composition obtained through the present invention can be molded into any of various components using any of various methods publicly known from hitherto, for example, injection molding, extrusion molding, or blow molding. The resulting moldings can be applied to applications in which flame retardancy and heat resistance are particularly required, for example, household appliance OA components, automobile parts, office equipment components, and electronic material components. Moreover, because the resin composition according to the present invention contains an extremely low amount of foreign matter, the resin composition according to the present invention is also suitable for a film or a sheet, generally obtained through extrusion sheet molding, as a molding. In this case, T die extrusion molding or inflation molding is preferable. A film or sheet having excellent heat resistance can be obtained, and hence this is also ideal for use as an electronic or electrical component.

EXAMPLES

The present invention will hereinafter be described based on Examples. Note, however, that they should not be construed as limiting the scope of the present invention.
Component (A): Polyphenylene ether resin (PPE): Poly(2,6-dimethyl-1,4-phenylene ether) as described in Manufacturing Example 1 below was used.

Manufacturing Example 1

Manufacturing Example for Polyphenylene Ether (PPE)
2,6-Dimethylphenol was subjected to oxidative polymerization under the presence of a catalyst in a toluene solvent, whereby a powder of poly(2,6-dimethyl-1,4-phenylene ether) having a reduced viscosity (measured at 30° C., 0.5 g/dl, chloroform solution) of 0.43 was obtained.
Component (B): Phenolic Stabilizer (Stabilizer 1)
The following Stabilizer 1 was used: Irganox 1330™ which is manufactured by Ciba Specialty Chemicals and which has a melting point=244° C., molecular weight=775, and (number of hydroxyl groups per a molecule)/(molecular weight)=0.00387

The structure corresponds to the following formula (2) with $R_1=R_2=R_3$=methyl group, and $R_4=R_5=R_6=R_7=R_8=R_9$=tertiary butyl group.

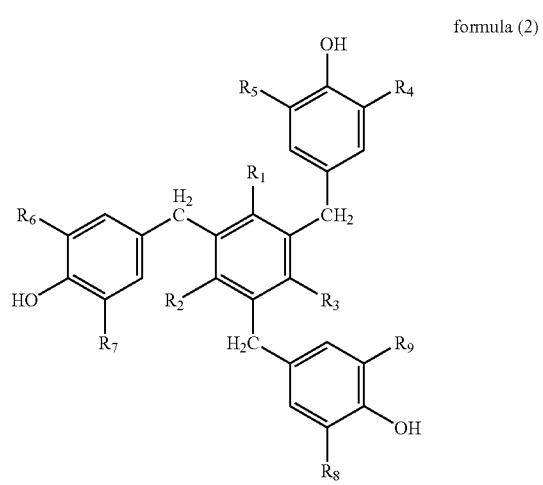

formula (2)

The following compounds were used for comparison with the component (B).
Compound-1: Irganox 1010™ which is manufactured by Ciba Specialty Chemicals, and which has a melting point=120° C., molecular weight=1178, and (number of hydroxyl groups per a molecule)/(molecular weight)=0.00340.
Compound-2: Benzoguanamine (manufactured by Nippon Carbide Industries Co., Inc., melting point=228° C., molecular weight=187).
Compound-3: Phthalimide (manufactured by Mitsuboshi Chemical Co., Ltd., melting point=234° C., molecular weight=147).
Compound-4: Aromatic condensed phosphate ester (manufactured by Daihachi Chemical Industry Co., Ltd., CR-741, colorless liquid, freezing point 4 to 5° C., molecular weight taking degree of condensation to be 1=739).
Compound-5: Silicone powder, crosslinked type, R-900, manufactured by Dow Corning Toray Silicone, white powder.
Compound-6: Zinc sulfide (ZnS) (manufactured by Wako Pure Chemical Industries, Ltd., special grade)
Component (C): Liquid-crystal polyester (LCP): A liquid-crystal polyester as described in Manufacturing Example 2 below was used.

Manufacturing Example 2

Manufacturing Example for Liquid-Crystal Polyester (LCP)
p-Hydroxybenzoic acid, 2-hydroxy-6-naphthoic acid and acetic anhydride were charged in under a nitrogen atmosphere, and were heated and thus molten, so as to carry out condensation polymerization, whereby a liquid-crystal polyester (LCP) having the following theoretical structural formula was obtained. Note that the component ratio given for the composition is the molar ratio.

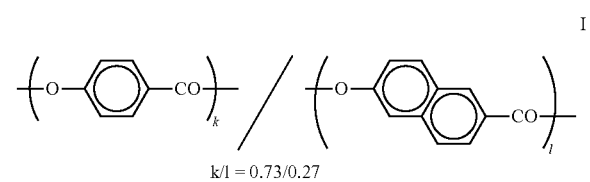

k/l = 0.73/0.27

Component (D): Liquid paraffin: Crystol™ N352 (manufactured by ExxonMobil, colorless liquid at normal temperature)
Component (E): ZnO: zinc oxide, Ginrei-A™, manufactured by Toho Zinc Co., Ltd.
Component (F): Silane-1: N-(β-aminoethyl)-γ-aminopropylmethyldimethoxysilane, KBM-602, manufactured by Shin-Etsu Chemical Co., Ltd.
Molding of each resin composition and evaluation of properties were carried out according to the following methods.
(1) Injection Molding
The obtained pellets were subjected to molding using an injection molding machine (IS-80EPN: manufactured by Toshiba Machine Co., Ltd.) with a cylinder temperatures set to 330/330/320/310° C. from the nozzle side to the feeding side, the injection rate set to 85%, and the mold temperature set to 90° C. Regarding the pressure at which each molding piece was injected, the gauge pressure was gradually increased, and molding was carried out with the gauge pressure set to 0.5 MPa above the gauge pressure at which a full shot could just be carried out in the longitudinal direction.

(2) Amount of Foreign Matter

The obtained pellets were injection molded as in the above (1), thus obtaining a plate-shaped molding piece of 90 mm length, 50 mm width and 2.5 mm thickness. The number of particles of foreign matter of maximum diameter not less than 50 μm contained in an area of 4 cm$^2$ on the surface of the molding piece was measured by reflection using an image analyzer (microscope unit: Nikon E600L, camera unit: Sony XC-003, image processing software: Nireco Luzex SE). The results are shown in Tables 1 to 3. Note that the lower the number of particles of foreign matter, the better performance.

(3) Heat Resistance

The obtained pellets were injection molded as in the above (1), thus forming an ASTM strip specimens of 3.2 mm thick× 127 mm length×12.7 mm width. Using the molding piece obtained in the above, the deflection temperature was measured under a load of 1.82 MPa in accordance with ASTM D648.

(4) Fluidity

When the obtained pellets were injection molded into a 1.6 mm-thick ASTM strip-shaped specimen under the molding conditions of the above (1), and during the molding the set pressure was reduced gradually from the pressure at which a full shot was possible, and the gauge pressure when the size was 1 mm short of the full shot size was measured. This pressure was taken as the SSP (abbreviation of "short shot pressure") (MPa). The lower the value thereof, the better the fluidity.

(5) Mold Deposit (Shown as "MD" in the Tables)

Molding of a plate-shaped molding piece of 90 mm length, 50 mm width and 2.5 mm thickness as in the above (2) was carried out continuously 100 times, and then the mold was inspected visually for deposit thereon, and the extent of mold deposit was judged in accordance with the following criteria:
O: Deposit not observed,
Δ: Small amount of deposit observed; and
x: Large amount of deposit observed.

(6) Metering Stability

Injection molding was carried out 100 times as in the above (5), the metering time was measured in each case, the standard deviation was taken as a measure of the extent of variation, and the metering stability was evaluated in accordance with the following judgment criteria:
O: Standard deviation being less than 0.3;
Δ: Standard deviation being from not less than 0.3 to less than 0.5; and
x: Standard deviation being not less than 0.5.

(7) Transparency

Using a strip-shaped specimen as used in the above (3), the specimen was placed on a piece of paper with text printed thereon such that the thickness was 3.2 mm, visual inspection was carried out from above, and the transparency was judged in accordance with the following criteria:
O: Text printed on paper can be made out clearly;
Δ: Text printed on paper can be made out, but not clear, i.e. slightly murky; and
x: Murky, so text printed on paper can be read only with difficulty or not at all.

(8) Amount of Fines Generated

As described in the examples below, the resin composition according to the present invention was subjected to melt kneading using a twin-screw extruder, and cooling with water was carried out to obtain strands, which were formed into pellets using a pelletizing cutter. 3 kg of the pellets were secured. All of this was sieved with a 20 mesh, and the weight of fines that passed through the mesh were recovered and was represented as a ratio based on the total weight, and the amount of fines generated was judged in accordance with the following judgment criteria. From the viewpoint of the molding work environment, the lower the amount of fines generated the better environment.
O: Ratio of amount of fines generated to total weight being less than 2%;
Δ: Ratio of amount of fines generated to total weight being from not less than 2% to less than 3%; and
x: Ratio of amount of fines generated to total weight being not less than 3%.

(9) Bleeding Out

A plate-shaped molding piece as in the above (2) was put for 2 hours in a hot air drying oven (Perfect Oven PHH-201, manufactured by Espec) set to 150° C., and was then taken out, and the surface of the molded plate was visually inspected, and bleeding out was judged based on the following judgment criteria:
O: Bled out matter not observed at all, and even upon rubbing surface of molding with finger, deposit not found on finger at all;
Δ: Bled out matter not observed upon visual inspection, but deposit found on finger upon rubbing surface of molding with finger; and
x: Powder or liquid clearly observed just upon visual inspection.

Examples 1 to 5 and Comparative Example 2

(A) Polyphenylene ether (PPE) and (B) phenolic stabilizer (Stabilizer 1) in the proportions (parts by weight) shown in Table 1 were subjected to melt kneading at a discharge rate of 8 kg/hr and a screw rotational speed of 300 rpm using a twin-screw extruder having a vent port (ZSK-25, manufactured by Werner and Pfleiderer) with all of the material being top fed, the temperature of the barrel immediately below the feeding position only being set to 280° C., and all of the other barrel temperatures and the die head temperature being set to 290° C., whereby pellets were obtained. Using these pellets, molding and evaluation were carried out according to the methods described above. The results are shown in Table 1.

Comparative Example 1

Pellets were obtained as in Example 1, except that (B) the phenolic stabilizer (Stabilizer-1) was not used. Using the pellets, molding and evaluation were carried out according to the methods described above. The results are shown in Table 1. In the evaluation of the fluidity, because the fluidity was poor, the specimen could not be obtained even at the maximum pressure of 13 MPa, and hence the SSP could not be determined.

Comparative Examples 3 to 7

Pellets were obtained as in Example 1, except that instead of (B) the phenolic stabilizer (Stabilizer-1), one of compounds-1 to -5 was used as shown in Table 1. Using the pellets, molding and evaluation were carried out according to the methods described above. The results are shown in Table 1.

Examples 6 and 8

Pellets were obtained as in Example 1, except that a polycarbonate resin (PC, Panlite L-1250Y™ (manufactured by Teijin Chemicals Ltd.) was used as the component (A), the proportions were set as in Table 1, and the molding temperature was set to 280° C. Using the pellets, molding and evaluation were carried out according to the methods described above. The results are shown in Table 1.

Example 7

Pellets were obtained as in Example 1, except that a blend of 90 parts by weight of polyphenylene ether (PPE) and 10 parts by weight of atactic polystyrene (GP, 685, manufactured by PS Japan) (shown as "PPE+PS 1" in Table 1) was used as the component (A). Using the pellets, molding and evaluation were carried out according to the methods described above. The results are shown in Table 1.

It can be seen from Table 1 that by making a thermoplastic resin contain a specified amount of a specified hindered phenol stabilizer in the present invention, the resin composition can be obtained which has an extremely low amount of foreign matter, has both good heat resistance and good fluidity, gives no mold deposit, and which has excellent metering stability and excellent transparency.

TABLE 1

| | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 | COMPARATIVE EXAMPLE 3 |
|---|---|---|---|---|---|---|---|---|
| (A)PPE | 100 | 100 | 100 | 100 | 100 | 100 | 100 | 100 |
| (A)PC | | | | | | | | |
| (A)PPE + PS1 | | | | | | | | |
| (B)STABILIZER-1 | 6.4 | 9.9 | 2 | 4.8 | 25 | 0 | 45 | |
| COMPOUND-1 | | | | | | | | 6.4 |
| COMPOUND-2 | | | | | | | | |
| COMPOUND-3 | | | | | | | | |
| COMPOUND-4 | | | | | | | | |
| COMPOUND-5 | | | | | | | | |
| AMOUNT OF FOREIGN MATTER (PARTICLES/4 cm2) | 97 | 45 | 298 | 288 | 41 | 1210 | 89 | 422 |
| HEAT RESISTANCE (° C.) | 176.4 | 175.0 | 179.9 | 178.1 | 169.1 | 185.0 | 130.0 | 165.7 |
| FLUIDITY: SSP(MPa) | 7.65 | 6.48 | 11.30 | 6.99 | 4.90 | >13 | 4.40 | 8.14 |
| MD | ○ | ○ | ○ | ○ | Δ | ○ | X | ○ |
| METERING STABILITY | ○ | ○ | Δ | Δ | ○ | Δ | X | Δ |
| TRANSPARENCY | ○ | ○ | ○ | ○ | ○ | ○ | ○ | ○ |

| | COMPARATIVE EXAMPLE 4 | COMPARATIVE EXAMPLE 5 | COMPARATIVE EXAMPLE 6 | COMPARATIVE EXAMPLE 7 | EXAMPLE 6 | EXAMPLE 7 | EXAMPLE 8 |
|---|---|---|---|---|---|---|---|
| (A)PPE | 100 | 100 | 100 | 100 | | | |
| (A)PC | | | | | 100 | | 100 |
| (A)PPE + PS1 | | | | | | 100 | |
| (B)STABILIZER-1 | | | | | 6.4 | 6.4 | 2 |
| COMPOUND-1 | | | | | | | |
| COMPOUND-2 | 6.4 | | | | | | |
| COMPOUND-3 | | 6.4 | | | | | |
| COMPOUND-4 | | | 6.4 | | | | |
| COMPOUND-5 | | | | 6.4 | | | |
| AMOUNT OF FOREIGN MATTER (PARTICLES/4 cm2) | 178 | 212 | 823 | 922 | 8 | 34 | 18 |
| HEAT RESISTANCE (° C.) | 165.4 | 176.2 | 170.4 | 184.0 | 119.0 | 160.0 | 123.0 |
| FLUIDITY: SSP(MPa) | 7.06 | 6.97 | 7.16 | >13 | 3.63 | 5.10 | 7.10 |
| MD | X | X | Δ | — | ○ | ○ | ○ |
| METERING STABILITY | X | X | X | ○ | ○ | ○ | Δ |
| TRANSPARENCY | Δ | Δ | ○ | X | ○ | ○ | ○ |

Examples 9 to 13, Comparative Examples 8 to 10

The components were selected from (A) polyphenylene ether (PPE), (B) phenolic stabilizer (Stabilizer-1), zinc sulfide (compound-6), (C) liquid-crystal polyester (LCP), (D) liquid paraffin, and (E) zinc oxide (ZnO), and in the proportions (parts by weight) shown in Table 2 the components were subjected to melt kneading at a discharge rate of 8 kg/hr and a screw rotational speed of 300 rpm using a twin-screw extruder having a vent port (ZSK-25, manufactured by Werner and Pfleiderer) with all of the material being top fed, the temperature of the barrel immediately below the feeding position only being set to 280° C., and all of the other barrel temperatures and the die head temperature being set to 290° C., whereby pellets were obtained. Using these pellets, molding and evaluation were carried out according to the methods described above. The results are shown in Table 2.

As can be seen from Table 2, adding (B) a specified hindered phenol stabilizer to the composition comprising (A) polyphenylene ether, (C) liquid-crystal polyester and (E) zinc oxide according to the present invention has great effects on reducing the amount of foreign matter and on reducing the amount of fines generated. Furthermore, it can be seen that by also using (D) liquid paraffin, the amount of foreign matter can be further reduced, and this is also effective for the fluidity.

Example 14

Pellets were obtained as in Example 13, except that (F) the silane compound (silane-1) was used instead of (E) zinc oxide (ZnO), and the proportions (parts by weight) shown in Table 2 were used. Using the pellets, molding and evaluation were carried out according to the methods described above. The results are shown in Table 2.

Example 15

Pellets were obtained as in Example 10, except that (E) zinc oxide (ZnO) was not used. Using the pellets, molding and evaluation were carried out according to the methods described above. The results are shown in Table 2. It can be seen that the amount of fines generated was slightly high, but still at a level at which there would be no problem in practice.

TABLE 2

|  | EXAMPLE 9 | EXAMPLE 10 | COMPARATIVE EXAMPLE 8 | COMPARATIVE EXAMPLE 9 | COMPARATIVE EXAMPLE 10 |
|---|---|---|---|---|---|
| (A)PPE | 100 | 100 | 100 | 100 | 100 |
| (B)STABILIZER-1 | 1.1 | 1.1 |  |  |  |
| COMPOUND-6 |  |  |  | 1.1 | 1.1 |
| (C)LCP | 5.3 | 5.3 | 5.3 | 5.3 | 5.3 |
| (D)LIQUID PARAFFIN |  | 1.1 | 1.1 |  | 1.1 |
| (E)ZnO | 0.84 | 0.84 | 0.84 | 0.84 | 0.84 |
| (F)SILANE-1 |  |  |  |  |  |
| AMOUNT OF FOREIGN MATTER (PARTICLES/4 cm2) | 362 | 122 | 1920 | 1076 | 881 |
| HEAT RESISTANCE (° C.) | 182.6 | 179.1 | 179.5 | 184.0 | 182.0 |
| FLUIDITY: SSP(MPa) | 9.6 | 7.4 | 8..2 | 10.3 | 9.8 |
| AMOUNT OF FINES GENERATED | ○ | ○ | ○ | X | X |
| BLEEDING OUT | ○ | ○ | ○ | ○ | X |

|  | EXAMPLE 11 | EXAMPLE 12 | EXAMPLE 13 | EXAMPLE 14 | EXAMPLE 15 |
|---|---|---|---|---|---|
| (A)PPE | 100 | 100 | 100 | 100 | 100 |
| (B)STABILIZER-1 | 2.6 | 2.6 | 1.1 | 2.2 | 1.1 |
| COMPOUND-6 |  |  |  |  |  |
| (C)LCP | 2.6 | 2.6 | 8.1 | 8.1 | 5.3 |
| (D)LIQUID PARAFFIN |  | 1.1 | 1.1 | 1.1 | 1.1 |
| (E)ZnO | 0.84 | 0.84 | 0.86 |  |  |
| (F)SILANE-1 |  |  |  | 0.22 |  |
| AMOUNT OF FOREIGN MATTER (PARTICLES/4 cm2) | 210 | 76 | 101 | 88 | 350 |
| HEAT RESISTANCE (° C.) | 178.4 | 178.0 | 181.0 | 182.1 | 184.0 |
| FLUIDITY: SSP(MPa) | 7.6 | 6.2 | 6.9 | 7.1 | 8.2 |
| AMOUNT OF FINES GENERATED | ○ | ○ | ○ | ○ | Δ |
| BLEEDING OUT | ○ | ○ | ○ | ○ | ○ |

Examples 16 and 17 and Comparative Examples 11 to 13

86.4 parts by weight of polyphenylene ether (PPE) and 13.6 parts by weight of atactic polystyrene (GP, 685, manufactured by PS Japan) were blended together as the component (A) (shown as "PPE+PS 2" in Table 3), the components were selected from (B) the phenolic stabilizer (Stabilizer-1), a hindered phenol compound (compound-1) as a comparison to the component (B), (C) liquid-crystal polyester (LCP), (D) liquid paraffin, and (E) zinc oxide (ZnO), and in the proportions (parts by weight) shown in Table 3 the components were subjected to melt kneading at a discharge rate of 8 kg/hr and a screw rotational speed of 300 rpm using a twin screw extruder having a vent port (ZSK-25, manufactured by Werner and Pfleiderer) with all of the material being top fed, the temperature of the barrel immediately below the feeding position only being set to 280° C., and all of the other barrel temperatures and the die head temperature being set to 290° C., whereby pellets were obtained. Using these pellets, molding and evaluation were carried out according to the methods described above. The results are shown in Table 3.

It can be seen from Table 3 that it is only when a hindered phenol having specified parameters is selected as the component (B) that the amount of foreign matter can be reduced extremely effectively, and the amount of fines generated can be greatly suppressed. Furthermore, there is also an effect on bleeding out. Moreover, it can be seen that adding (D) liquid paraffin is effective in further reducing the amount of foreign matter and conferring fluidity.

Examples 18 to 21, Comparative Examples 14 and 15

The components were selected from (A) polyphenylene ether (PPE), (B) the phenolic stabilizer (Stabilizer-1), (C) liquid-crystal polyester (LCP), (D) liquid paraffin, (E) zinc oxide (ZnO), and (F) silane compound (silane-1), and in the proportions (parts by weight) shown in Table 3 the components were subjected to melt kneading at a discharge rate of 8 kg/hr and a screw rotational speed of 300 rpm using a twin-screw extruder having a vent port (ZSK-25, manufactured by Werner and Pfleiderer) with all of the material being top fed, the temperature of the barrel immediately below the feeding position only being set to 280° C., and all of the other barrel temperatures and the die head temperature being set to 290° C., whereby pellets were obtained. Using these pellets, molding and evaluation were carried out according to the methods described above. The results are shown in Table 3.

TABLE 3

|  | EXAMPLE 16 | EXAMPLE 17 | COMPARATIVE EXAMPLE 11 | COMPARATIVE EXAMPLE 12 | COMPARATIVE EXAMPLE 13 | EXAMPLE 18 |
|---|---|---|---|---|---|---|
| (A)PPE + PS2 | 100 | 100 | 100 | 100 | 100 | |
| (A)PPE | | | | | | 100 |
| (B)STABILIZER-1 | 0.91 | 0.91 | | | | 0.59 |
| COMPOUND-1 | | | | 0.91 | | |
| (C)LCP | 4.5 | 4.5 | 4.5 | 4.5 | 4..5 | 17.6 |
| (D)LIQUID PARAFFIN | | 0.91 | | | 0.91 | |
| (E)ZnO | 0.73 | 0.73 | 0.73 | 0.73 | 0.73 | 0.94 |
| (F)SILANE-1 | | | | | | |
| AMOUNT OF FOREIGN MATTER (PARTICLES/4 cm2) | 169 | 68 | 430 | 251 | 411 | 122 |
| HEAT RESISTANCE (° C.) | 165.4 | 164.5 | 165.0 | 163.9 | 164.1 | 1181.5 |
| FLUIDITY: SSP(MPa) | 6.2 | 5.9 | 6.7 | 6.4 | 6.4 | 4.6 |
| AMOUNT OF FINES GENERATED | ◯ | ◯ | X | X | X | ◯ |
| BLEEDING OUT | ◯ | ◯ | ◯ | Δ | Δ | ◯ |

|  | COMPARATIVE EXAMPLE 14 | EXAMPLE 19 | EXAMPLE 20 | COMPARATIVE EXAMPLE 15 | EXAMPLE 21 |
|---|---|---|---|---|---|
| (A)PPE + PS2 | | | | | |
| (A)PPE | 100 | 100 | 100 | 100 | 100 |
| (B)STABILIZER-1 | | 0.59 | 0.5 | | 0.5 |
| COMPOUND-1 | | | | | |
| (C)LCP | 17.6 | 17.6 | 30 | 30 | 30 |
| (D)LIQUID PARAFFIN | | 1.5 | | | 0.5 |
| (E)ZnO | 0.94 | 0.94 | 15 | 15 | 15 |
| (F)SILANE-1 | | | | | 0.1 |
| AMOUNT OF FOREIGN MATTER (PARTICLES/4 cm2) | 397 | 55 | 98 | 499 | 51 |
| HEAT RESISTANCE (° C.) | 181.9 | 179.5 | 177.0 | 177.1 | 176.7 |
| FLUIDITY: SSP(MPa) | 5.0 | 4.4 | 4.5 | 5.1 | 4.2 |
| AMOUNT OF FINES GENERATED | X | ◯ | ◯ | X | ◯ |
| BLEEDING OUT | ◯ | ◯ | ◯ | ◯ | ◯ |

From the above, it can be seen that according to the first aspect of the present application, the resin composition containing specified amounts of the component (A) and the component (B) provides the resin composition in which fluidity is conferred while maintaining the high heat resistance of the highly heat-resistant non-crystalline resin, the amount of foreign matter is greatly reduced, there is no mold deposit, the metering stability is excellent, and the transparency is also good.

Next, it can be seen that according to the second aspect of the present application, the resin composition containing specified amounts of the component (A), the component (B) and the component (C) provides the resin composition in which good heat resistance and fluidity are both achieved, the amount of foreign matter is reduced, generation of fines is reduced, and there is no bleeding out. Furthermore, it can be seen that the component (D) is effective in further reducing the amount of foreign matter and conferring fluidity. It can also be seen that adding the component (E) and the component (F) is effective on the amount of fines generated.

INDUSTRIAL APPLICABILITY

According to the first aspect of the present application there can be provided the resin composition in which fluidity is conferred while maintaining the high heat resistance of a highly heat-resistant non-crystalline resin, the amount of foreign matter is greatly reduced, there is no mold deposit, the metering stability is excellent, and the transparency is also good. Furthermore, according to the second aspect of the present application there can be provided the resin composition according in good heat resistance and fluidity are both achieved, the amount of foreign matter is reduced, generation of fines is reduced, and there is no bleeding out. It thus becomes possible to stably produce a high-performance high-quality resin composition, which is of extremely high utility value in industry.

We claim:

1. A resin composition comprising:
   (A) a resin component comprising 70 to 100% by weight of at least one resin selected from the group consisting of a polyphenylene ether resin, a polysulfone resin, a polyethersulfone resin, a polyarylate resin, a polyamide-imide resin, a polyetherimide resin, and a thermoplastic polyimide resin; and
   (B) a stabilizer consisting of a phenolic stabilizer having a melting point of not less than 200° C., the phenolic stabilizer being from more than 5 to 40 parts by weight based on 100 parts by weight of the resin component (A), wherein the phenolic stabilizer (B) has a structure represented by the following formula (2):

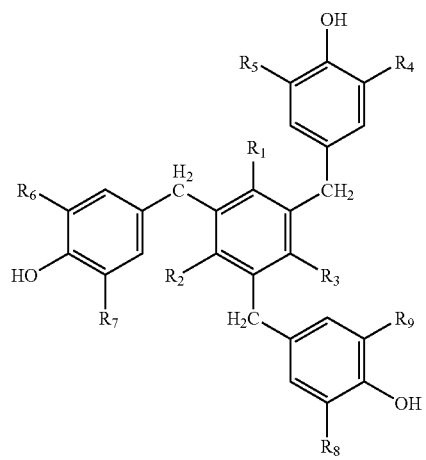

formula (2)

wherein each of $R_1$, $R_2$ and $R_3$ independently represents a group selected from the group consisting of a hydrogen atom and alkyl groups having 1 to 5 carbon atoms, and each of $R_4$, $R_5$, $R_6$, $R_7$, $R_8$ and $R_9$ independently represents a group selected from the group consisting of a hydrogen atom and alkyl groups having 1 to 6 carbon atoms, wherein the phenolic stabilizer (B) is the only stabilizer contained in the resin composition.

2. The resin composition according to claim 1, wherein the phenolic stabilizer (B) is a phenolic stabilizer having a molecular weight of not less than 400, and a value of (number of hydroxyl group per a molecule/molecular weight) of not less than 0.0035.

3. The resin composition according to claim 1, wherein the resin component (A) is a polyphenylene ether resin.

4. The resin composition according to claim 1, further comprising: (C) 0.1 to 30 parts by weight of a liquid-crystal polyester based on 100 parts by weight of the resin component (A).

5. The resin composition according to claim 4, wherein the liquid-crystal polyester (C) comprises the following structural units (i) and (ii):

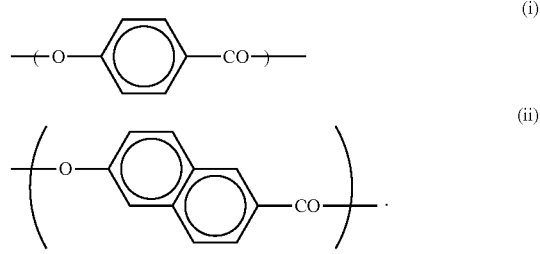

6. The resin composition according to claim 4, further comprising: (E) 0.1 to 20 parts by weight of a compound containing a monovalent, divalent, trivalent or tetravalent metallic element based on 100 parts by weight of the resin component (A).

7. The resin composition according to claim 6, wherein the compound (E) containing the monovalent, divalent, trivalent or tetravalent metallic element is $Mg(OH)_2$.

8. The resin composition according to claim 4, further comprising: (F) 0.1 to 5 parts by weight of a silane compound having an amino group based on 100 parts by weight of the resin component (A).

9. The resin composition according to claim 1, further comprising: (D) 0.1 to 5 parts by weight of a lubricant based on 100 parts by weight of the resin component (A).

10. The resin composition according to claim 9, wherein the lubricant is liquid paraffin.

11. A resin composition comprising:
(A) a resin component comprising 70 to 100% by weight of a polyphenylene ether resin;
(B) a stabilizer consisting of a phenolic stabilizer having a melting point of not less than 200° C., the phenolic stabilizer being from 0.1 to 40 parts by weight based on 100 parts by weight of the resin component (A), wherein the phenolic stabilizer (B) has a structure represented by the following formula (2):

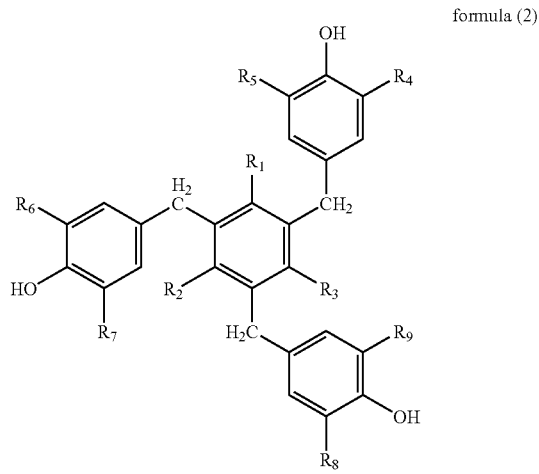

formula (2)

wherein each of the $R_1$, $R_2$ and $R_3$ independently represents a group selected from the group consisting of a hydrogen atom and alkyl groups having 1 to 5 carbon atoms, and each of $R_4$, $R_5$, $R_6$, $R_7$, $R_8$ and $R_9$ independently represents a group selected from the group consisting of a hydrogen atom and alkyl groups having 1 to 6 carbon atoms;
(C) 0.1 to 30 parts by weight of a liquid-crystal polyester based on 100 parts by weight of the resin component (A); and
(D) 0.1 to 5 parts by weight of a lubricant based on 100 parts by weight of the resin component (A),
wherein the phenolic stabilizer (B) is the only stabilizer contained in the resin composition.

12. The resin composition according to claim 11, wherein the phenolic stabilizer (B) is a phenolic stabilizer having a molecular weight of not less than 400, and a value of (number of hydroxyl group per a molecule/molecular weight) of not less than 0.0035.

13. The resin composition according to claim 11, wherein the phenolic stabilizer (B) is contained in a range of from more than 5 to not more than 40 parts by weight based on 100 parts by weight of the resin component (A).

14. The resin composition according to claim 11, wherein the liquid-crystal polyester (C) comprises the following structural units (i) and (ii):

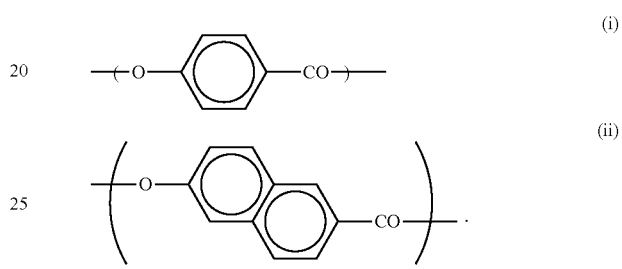

15. The resin composition according to claim 11, wherein the lubricant is liquid paraffin.

16. The resin composition according to claim 11, further comprising:
(E) 0.1 to 20 parts by weight of a compound containing a monovalent, divalent, trivalent or tetravalent metallic element based on 100 parts by weight of the resin component (A).

17. The resin composition according to claim 16, wherein the compound (E) containing the monovalent, divalent, trivalent or tetravalent metallic element is $Mg(OH)_2$.

18. The resin composition according to claim 11, further comprising:
(F) 0.1 to 5 parts by weight of a silane compound having an amino group based on 100 parts by weight of the resin component (A).

* * * * *

UNITED STATES PATENT AND TRADEMARK OFFICE
CERTIFICATE OF CORRECTION

PATENT NO. : 8,691,898 B2  
APPLICATION NO. : 11/665369  
DATED : April 8, 2014  
INVENTOR(S) : Kamo et al.

Page 1 of 1

It is certified that error appears in the above-identified patent and that said Letters Patent is hereby corrected as shown below:

On the Title Page Item [74] (*Attorney, Agent, or Firm*), Line 1, delete "Halssey" and insert -- Halsey --, therefor.

Signed and Sealed this
Nineteenth Day of August, 2014

Michelle K. Lee
*Deputy Director of the United States Patent and Trademark Office*